United States Patent
Guo et al.

(10) Patent No.: US 9,029,476 B2
(45) Date of Patent: May 12, 2015

(54) LIGHT DIFFUSING POLYMER COMPOSITION, METHOD OF PRODUCING THE SAME, AND ARTICLES MADE THEREFROM

(71) Applicant: Rohm and Haas Company, Philadelphia, PA (US)

(72) Inventors: Hailan Guo, Warrington, PA (US); Eric G. Lundquist, North Wales, PA (US); Luu Le, Erdenheim, PA (US)

(73) Assignee: Rohm and Haas Company, Philadelphia, PA (US)

( * ) Notice: Subject to any disclaimer, the term of this patent is extended or adjusted under 35 U.S.C. 154(b) by 122 days.

(21) Appl. No.: 13/850,435

(22) Filed: Mar. 26, 2013

(65) Prior Publication Data
US 2013/0317175 A1    Nov. 28, 2013

Related U.S. Application Data

(60) Provisional application No. 61/651,956, filed on May 25, 2012.

(51) Int. Cl.
| | |
|---|---|
| *C08L 33/10* | (2006.01) |
| *C08L 33/12* | (2006.01) |
| *G02B 5/02* | (2006.01) |
| *C08F 265/06* | (2006.01) |
| *C08F 220/18* | (2006.01) |

(52) U.S. Cl.
CPC ............... *G02B 5/02* (2013.01); *C08F 265/06* (2013.01); *C08L 33/10* (2013.01); *C08L 33/12* (2013.01); *C08F 2220/1825* (2013.01)

(58) Field of Classification Search
USPC ............. 525/80, 81, 185, 225, 227, 228, 205, 525/207, 216
See application file for complete search history.

(56) References Cited

U.S. PATENT DOCUMENTS

| | | | |
|---|---|---|---|
| 5,237,004 A | 8/1993 | Wu et al. | |
| 8,084,543 B2 | 12/2011 | Lafleur et al. | |
| 2008/0182958 A1* | 7/2008 | Lafleur et al. | ............. 526/317.1 |
| 2008/0218659 A1 | 9/2008 | Kanaya et al. | |

FOREIGN PATENT DOCUMENTS

| | | |
|---|---|---|
| JP | 2005247999 | 9/2005 |
| JP | 2010029193 | 10/2010 |
| WO | WO 2006/100127 A2 * | 9/2006 |

OTHER PUBLICATIONS

EP Office Action dated Dec. 2, 2013; from EP counterpart Application No. 13161396.0.
Instructions to EP Office Action dated Apr. 7, 2014; from EP counterpart Application No. 13161396.0.
Response to EP Office Action dated May 21, 2014; from EP counterpart Application No. 13161396.0.

* cited by examiner

*Primary Examiner* — Fred M Teskin

(57) ABSTRACT

A composition comprising: a blended product of: a matrix polymer; and from 0.05 to 2.5 wt % diffuser polymeric particles, wherein the diffuser polymeric particles are characterized by an average diameter from 2.0 to 8 micrometers, a particle size distribution such that at least 90 wt % of the polymer particles fall within ±30% of the volume average particle size, a refractive index, RI, from 1.50 to 1.55; a crosslinking level great than 4%; and wherein the diffuser polymeric particles are produced using at least one alkyl (meth)acrylate monomer copolymerized with from 5 wt % to 25 wt % crosslinking monomer selected from the group consisting of aliphatic crosslinking monomers, aromatic crosslinking monomers, and combinations thereof, and optionally, one or more comonomers selected from the group consisting of aryl(meth)acrylate monomers and monovinyl arenes is provided.

21 Claims, No Drawings

LIGHT DIFFUSING POLYMER COMPOSITION, METHOD OF PRODUCING THE SAME, AND ARTICLES MADE THEREFROM

This application is a U.S. Application, which claims priority to U.S. Provisional Application No. 61/651,956, filed on May 25, 2012, which is incorporated by reference in its entirety.

FIELD OF INVENTION

The instant invention relates to a light diffusing polymer composition, method of producing the same, articles made therefrom, and methods for making such articles.

BACKGROUND OF THE INVENTION

A light-emitting diode (LED) is a semiconductor light source which is a more eco-friendly lighting alternative. Because of their low energy consumption and low maintenance features, LEDs have been used widely as status indicators and displays on a variety of equipment and display devices. Currently, there are numerous legislative and regulatory efforts to mandate the use of LEDs as the primary lighting option for home and office spaces.

LEDs produce very bright but very focused light. Therefore, LED light output often appears harsh and may cause uncomfortable glare. Adequate packaging materials, such as plastic boards and/or sheets embedded with light scattering particles are currently used to diffuse the LED light and to provide more even illumination and to lessen glare. Plastics used in such lighting applications include polycarbonate (PC), polymethylmethacrylate (PMMA), and polystyrene (PS). Both inorganic particles, such as $TiO_2$ particles, and organic particles, such as cross-linked polymethylmethacrylate, polystyrene and/or silicone beads, are currently used as scattering media or light diffusers. However, light diffusing beads can also lead to light transmission loss, which could significantly reduce the efficiency of LED lighting options. Therefore, a need exists for LED diffusers which provide high light transmission while maintaining adequate diffusivity.

SUMMARY OF THE INVENTION

The instant invention is a light diffusing polymer composition, method of producing the same, articles made therefrom, and methods for making such articles.

In one embodiment, the instant invention provides a composition comprising: a blended product of: a matrix polymer; and from 0.05 to 2.5 wt % diffuser polymer particles, wherein the diffuser polymer particles are characterized by an average diameter from 2.0 to 8µ, a particle size distribution such that at least 90 wt % of the polymer particles fall within ±30% of the volume average particle size, a refractive index, RI, from 1.50 to 1.55; a crosslinking level great than 4%; and wherein the diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof, and optionally, one or more comonomers selected from the group consisting of aryl(meth)acrylate monomers and monovinyl arenes.

DETAILED DESCRIPTION OF THE INVENTION

The instant invention is a light diffusing polymer composition, method of producing the same, articles made therefrom, and methods for making such articles.

The light diffusing composition according to the present invention comprises: a blended product of: a matrix polymer; and from 0.05 to 2.5 wt % diffuser polymer particles, wherein the diffuser polymer particles are characterized by an average diameter from 2.0 to 8µ, a particle size distribution such that at least 90 wt % of the polymer particles fall within ±30% of the volume average particle size, a refractive index, RI, from 1.50 to 1.55; a crosslinking level greater than 4%; and wherein the diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof, and optionally, one or more comonomers selected from the group consisting of aryl(meth)acrylate monomers and monovinyl arenes.

The terms "µ," "µm," and "micrometers" are used synonymously herein.

As used herein, the term (meth)acrylate means acrylate, methacrylate, or combinations of acrylate and methacrylate. For example, the term methyl(meth)acrylate may mean solely methyl methacrylate, solely methyl acrylate or a combination of methyl methacrylate and methyl acrylate.

In another embodiment, the instant invention provides a method of producing the light diffusing composition comprising copolymerizing at least one alkyl(meth)acrylate monomer copolymerized with from 5 wt % to 25 wt % crosslinking monomer selected from the group consisting of aliphatic crosslinking monomers, aromatic crosslinking monomers and combinations thereof to form diffuser polymer particles and blending the diffuser polymer particles into a matrix polymer wherein the diffuser polymer particles are present in the composition at a level from 0.05 to 2.5 wt % based on the weight of the matrix polymer plus the weight of the diffuser polymer particle.

In another embodiment, the instant invention provides articles comprising the light diffusing composition according to the present invention.

The method for making articles according to the present invention comprises: forming one or more light diffusing compositions into an article wherein the forming comprises thermoforming, extruding, calendaring, injection molding, or any combination thereof.

Matrix polymers useful in the invention may include any one or combination of two or more polymers in which the diffuser polymer particles may be blended.

In an alternative embodiment, the instant invention provides a light diffusing composition, method of producing the same, articles made therefrom, and method of making such articles, in accordance with any of the preceding embodiments, except that the matrix polymer is selected from the group consisting of polycarbonates, polymethylmethacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride, copolymers, cyclic olefin copolymers, polyesters, polyethylene terephthalate, and combinations thereof.

In an alternative embodiment, the instant invention provides a composition, method of producing the same, articles made therefrom, and method of making such articles, in accordance with any of the preceding embodiments, except that the matrix polymer is one or more polycarbonates.

The light diffusing polymer composition comprises from 0.05 to 2.5 wt % diffuser polymer particles. All individual values and subranges from 0.05 to 2.5 wt % are included herein and disclosed herein; for example, the amount of diffuser polymer particles can be from a lower limit of 0.05, 0.1, 0.5, 1.0, 1.25, 1.75, 2.0, or 2.5 wt % to an upper limit of 0.1, 0.75, 1.0, 1.5, 1.85, 2.5, or 2.75 wt %. For example, the amount of diffuser polymer particles may be in the range of from 0.05 to 2.5 wt %, or in the alternative, the amount of diffuser polymer particles may be in the range of from 0.5 to 1.75 wt %, or in the alternative, the amount of diffuser polymer particles may be in the range of from 1.0 to 2.25 wt %, or in the alternative, the amount of diffuser polymer particles may be in the range of from 0.1 to 1.5 wt %.

The diffuser polymer particles are characterized by an average diameter from 2.0 to 8 micrometers (or $\mu$). All individual values and subranges from 2.0 to $8\mu$ are included herein and disclosed herein; for example, the average diameter of the diffuser polymer particle can be from a lower limit of 2.0, 2.5, 3, 3.6, 4.1, 4.8, 5.5, 6, 6.9, 7.4, or $7.8\mu$ to an upper limit of 2.8, 3.4, 3.9, 4.25, 5, 5.75, 6.2, 7, 7.5 or $8\mu$. For example, the average diameter of the diffuser polymer particle may be in the range of from 2.0 to $8\mu$, or in the alternative, the average diameter of the diffuser polymer particle may be in the range of from 2.75 to $6.8\mu$, or in the alternative, the average diameter of the diffuser polymer particle may be in the range of from 3 to $7.0\mu$, or in the alternative, the average diameter of the diffuser polymer particle may be in the range of from 2.0 to $5\mu$, or in the alternative, the average diameter of the diffuser polymer particle may be in the range of from 4.8 to $8\mu$.

The diffuser polymer particles are characterized by a particle size distribution such that at least 90 wt % of the diffuser polymer particles fall within ±30% of the volume average particle size. All individual values and subranges from at least 90 wt % are included herein and disclosed herein; for example, the wt % of diffuser polymer particles which fall within ±30% of the volume average particle size can be from a lower limit of 90, 92, 94, 96 or 98 wt %.

Narrower particle size distributions are also included herein and disclosed herein. For example, at least 90 wt % of the diffuser polymer particles may fall within ±30% of the volume average particle size, or in the alternative, within ±25% of the volume average particle size, or in the alternative, within ±20% of the volume average particle size, or in the alternative, within ±15% of the volume average particle size.

Alternatively more than 1 particle size distribution each with at least 90 wt % of the diffuser polymer particles falling within ±30% of the volume average particle size of that distribution. All individual values and subranges from at least 90 wt % are included herein and disclosed herein; for example, the wt % of diffuser polymer particles which fall within ±30% of the volume average particle size of that distribution can be from a lower limit of 90, 92, 94, 96 or 98 wt %.

The diffuser polymer particles are characterized by a refractive index, RI, from 1.50 to 1.55. All individual values and subranges from 1.5 to 1.55 are included herein and disclosed herein; for example, the RI of the diffuser polymer particles can be from a lower limit of 1.5, 1.51, 1.52, 1.53 or 1.54 to an upper limit of 1.51, 1.52, 1.53, 1.54, or 1.55. For example, the RI of the diffuser polymer particles may be in the range of from 1.5 to 1.55, or in the alternative, the RI of the diffuser polymer particles may be in the range of from 1.53 to 1.55, or in the alternative, the RI of the diffuser polymer particles may be in the range of from 1.5 to 1.54, or in the alternative, the RI of the diffuser polymer particles may be in the range of from 1.52 to 1.54.

The diffuser polymer particles are characterized by a crosslinking level greater than 4 wt %. All individual values and subranges from greater than 4 wt % are included herein and disclosed herein; for example, the crosslinking level of the diffuser polymer particles can be from a lower limit of 4, 5, 6, 7, 8, 10, 12, or 14 wt %.

The diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof.

In an alternative embodiment, the instant invention provides a light diffusing composition, method of producing the same, articles made therefrom, and method of making such articles, in accordance with any of the preceding embodiments, except that diffuser polymer particles are made using any one or more alkyl(meth)acrylate monomer.

In a particular embodiment, the diffuser polymer particles are produced using $C_2$-$C_8$ acrylate monomers. For example, the diffuser polymer particles may be produced using ethyl acrylate, propyl acrylate, butyl acrylate monomers or any combination thereof.

In an alternative embodiment, the diffuser polymer particles are produced using $C_1$-$C_8$ methacrylate monomers. For example, the diffuser polymer particles may be produced using methyl methacrylate, ethyl methacrylate, butyl methacrylate monomers or any combination thereof.

In an alternative embodiment, the instant invention provides a light diffusing composition, method of producing the same, articles made therefrom, and method of making such articles, in accordance with any of the preceding embodiments, except that diffuser polymer particles are made using methyl methacrylate.

In an alternative embodiment, the instant invention provides a light diffusing composition, method of producing the same, articles made therefrom, and method of making such articles, in accordance with any of the preceding embodiments, except that diffuser polymer particles are made using methyl methacrylate copolymerized with divinylbenzene.

In an alternative embodiment, the instant invention provides a light diffusing composition, method of producing the same, articles made therefrom, and method of making such articles, in accordance with any of the preceding embodiments, except that diffuser polymer particles are made using any one or more aryl(meth)acrylate monomers. Exemplary aryl(meth)acrylates include substituted and unsubstituted phenyl(meth)acrylates such as phenyl methacrylate and naphthyl methacrylate and substituted and unsubstituted benzyl(meth)acrylates such as benzyl methacrylate and benzyl acrylate.

In an alternative embodiment, the instant invention provides a light diffusing composition, method of producing the same, articles made therefrom, and method of making such articles, in accordance with any of the preceding embodiments, except that diffuser polymer particles are made using any two or more alkyl(meth)acrylate monomers. For example, the diffuser polymer particles may be made using butyl acrylate and methyl methacrylate monomers, or in the alternative, the diffuser polymer particles may be made using butyl methacrylate and methyl methacrylate monomers.

In an alternative embodiment, the instant invention provides a light diffusing composition, method of producing the same, articles made therefrom, and method of making such articles, in accordance with any of the preceding embodiments, except that diffuser polymer particles are made by copolymerizing the one or more alkyl(meth)acrylate monomer copolymerized with from 5 wt % to 25 wt % crosslinking monomer selected from the group consisting of aliphatic crosslinking monomers, aromatic crosslinking monomers and combinations thereof. All individual values and subranges from 5 wt % to 25 wt % crosslinking monomer are included herein and disclosed herein; for example, the amount of crosslinking monomer can be from a lower limit of 5, 8, 11.5, 14, 17.7, 21 or 24 wt % to an upper limit 6, 9.2, 12, 15.6, 18, 23.5 or 25 wt %. For example, the amount of crosslinking monomer may be in the range of from 5 to 25 wt %, or in the alternative, the amount of crosslinking monomer may be in the range of from 5 to 15 wt %, or in the alternative, the amount of crosslinking monomer may be in the range of from 15 to 55 wt %, or in the alternative, the amount of crosslinking monomer may be in the range of from 7.5 to 18 wt %, or in the alternative, the amount of crosslinking monomer may be in the range of from 9 to 23 wt %.

Any, or any combination of, aliphatic crosslinking monomers and aromatic crosslinking monomer(s) suitable for copolymerization with the one or more alkyl(meth)acrylate monomers, may be used. For example, the crosslinking monomer(s) may be selected from the group consisting of divinylbenzene, trivinylbenzene, diallylphthalate, allyl methacrylate, butanediol di(meth)acrylate, ethyleneglycol di(meth)acrylate, diethyleneglycol di(meth)acrylate, trimethylolpropane tri(meth)acrylate, divinylsulfone and combinations thereof.

The diffuser polymer particles may, optionally, be produced by copolymerizing the one or more alkyl(meth)acrylate monomers and crosslinking monomer(s) with one or more comonomers selected from the group consisting of aryl(meth)acrylate monomers and monovinyl arenes.

Aryl(meth)acrylates useful for optionally copolymerizing with the one or more alkyl(meth)acrylate monomers and crosslinking monomer include, for example, phenyl methacrylate, phenylethyl methacrylates, phenylpropyl methacrylates; arylalkyl methacrylates, in which the aryl group is substituted with alkyl groups, halogen atoms, alkoxy groups, nitro groups, or similar substituents which will not interfere with the polymerization reaction, aryloxyalkyl; (meth)acrylates, such as phenoxyethyl methacrylates, and benzyloxyethyl methacrylates and benzyl(meth)acrylates in which the aryl group is substituted or unsubstituted.

Monovinyl arenes contain from 8 to about 16 carbon atoms per molecule. These compounds can carry no other substituent on the aromatic nucleus than the vinyl substituent or they can be additionally substituted on the aromatic nucleus by alkyl, cycolalkyl, aryl, halogen, alkylaryl and arylalkyl radicals. Exemplary monovinyl arenes useful for optionally copolymerizing with the one or more alkyl(meth)acrylate monomers and crosslinking monomer(s) include styrene, 3-methylstyrene, 4-propylstyrene, 1-vinylnaphthalene, 4-cyclohexylstyrene, p-tolylstyrene, p-benzylstyrene, 1-vinyl-5-butylnaphthalene, bromostyrene, chlorostyrene.

In an alternative embodiment, the instant invention provides a composition, method of producing the same, articles made therefrom, and method of making such articles, in accordance with any of the preceding embodiments, except that the diffuser polymer particles are produced by copolymerizing one or more alkyl(meth)acrylate monomers and divinylbenzene with methyl methacrylate.

In an alternative embodiment, the instant invention provides a composition, method of producing the same, articles made therefrom, and method of making such articles, in accordance with any of the preceding embodiments, except that the diffuser polymer particles are produced in the absence of aryl(meth)acrylate monomers and/or monovinyl arenes.

In an alternative embodiment, the instant invention provides a composition, method of producing the same, articles made therefrom, and method of making such articles, in accordance with any of the preceding embodiments, except that the diffuser polymeric particles comprise from 50 to 90 wt % units derived from at least one alkyl(meth)acrylate monomer, from 5 to 25 wt % units derived from one or more aryl(meth)acrylate comonomers, and from 5 to 25 wt % crosslinking monomer selected from the group consisting of aliphatic crosslinking monomers, aromatic crosslinking monomers and combinations thereof.

All individual values and subranges from 50 to 90 wt % units derived from one or more alkyl(meth)acrylate comonomers are included herein and disclosed herein; for example, the amount of units derived from alkyl methacrylate comonomers can be from a lower limit of 50, 55, 60, 65, 72, 78, 84, 88, or 89 wt % to an upper limit of 52, 59, 64, 70, 78, 85, 89 or 90 wt %. For example, the amount of units derived from alkyl methacrylate comonomers may be in the range of from 50 to 90 wt %, or in the alternative, the amount of units derived from alkyl methacrylate comonomers may be in the range of from 50 to 70 wt %, or in the alternative, the amount of units derived from alkyl methacrylate comonomers may be in the range of from 60 to 90 wt %, or in the alternative, the amount of units derived from alkyl methacrylate comonomers may be in the range of from 63 to 87 wt %, or in the alternative, the amount of units derived from alkyl methacrylate comonomers may be in the range of from 52 to 78 wt %.

All individual values and subranges from 5 to 25 wt % units derived from one or more aryl(meth)acrylate comonomers are included herein and disclosed herein; for example, the amount of units derived from one or more aryl(meth)acrylate comonomers can be from a lower limit of 5, 8, 11, 14, 17, 20, 23 or 24 wt % to an upper limit of 6, 9, 12, 15, 18, 21, 24 or 25 wt %. For example, the amount of units derived from one or more aryl(meth)acrylate comonomers may be in the range of from 5 to 25 wt %, or in the alternative, the amount of units derived from aryl(meth)acrylate comonomers may be in the range of from 50 to 15 wt %, or in the alternative, the amount of units derived from aryl(meth)acrylate comonomers may be in the range of from 15 to 27 wt %, or in the alternative, the amount of units derived from aryl(meth)acrylate comonomers may be in the range of from 12 to 20 wt %, or in the alternative, the amount of units derived from aryl(meth)acrylate comonomers may be in the range of from 14 to 22 wt %.

All individual values and subranges from 5 to 25 wt % units derived from one or more crosslinking monomer are included herein and disclosed herein; for example, the amount of units derived from one or more crosslinking monomer can be from a lower limit of 5, 8, 11, 14, 17, 20, 23 or 24 wt % to an upper limit of 6, 9, 12, 15, 18, 21, 24 or 25 wt %. For example, the amount of units derived from one or more crosslinking monomer may be in the range of from 5 to 25 wt %, or in the alternative, the amount of units derived from crosslinking comonomers may be in the range of from 50 to 15 wt %, or in the alternative, the amount of units derived from crosslinking comonomers may be in the range of from 15 to 27 wt %, or in the alternative, the amount of units derived from crosslinking comonomers may be in the range of from 12 to 20 wt %, or in the alternative, the amount of units derived from crosslinking comonomers may be in the range of from 14 to 22 wt %.

Diffuser polymer particles average particle sizes discussed herein are volume average particle sizes.

In an alternative embodiment, the instant invention provides a light diffusing composition, method of producing the same, articles made therefrom, and method of making such articles, in accordance with any of the preceding embodiments, except that the diffuser polymer particles exhibit a multimodal particle size distribution such that at least 90 wt % of the diffuser polymer particles fall within ±30% of the volume average particle size for each particle size peak. For example, the particle size distribution may be unimodal, bimodal, trimodal, or quadramodal. It will be understood that the particle size peak(s) may be centered at any size between 2 and 8μ. All values between 2 and 8μ are included herein and disclosed herein; for example the particle size peak(s) may be centered at 2, 2.25, 2.5, 2.75, 3, 2.5, 4.24, 4.8, 5.4, 5.8, 6.3, 6.7, 7, 7.25, 7.75, or 8μ.

In an alternative embodiment, the instant invention provides a light diffusing composition, method of producing the same, articles made therefrom, and method of making such articles, in accordance with any of the preceding embodiments, except that the diffuser polymer particles exhibit a bimodal particle size distribution.

In yet another alternative embodiment, the instant invention provides a light diffusing composition, method of producing the same, articles made therefrom, and method of making such articles, in accordance with any of the preceding embodiments, except that the diffuser polymer particles exhibit a bimodal particle size distribution which includes a smaller particle size peak centered between 2 and 3μ and a larger particle size peak centered between 5 and 6μ. In an alternative embodiment, the smaller particle size peak may be centered between 2.25 and 2.75μ and the larger particle size peak may be centered between 5.25 and 5.75μ.

In an alternative embodiment, the instant invention provides a composition, method of producing the same, articles made therefrom, and method of making such articles, in accordance with any of the preceding embodiments, except that the diffuser polymer particles are produced via suspension polymerization, emulsion polymerization, dispersion polymerization or miniemulsion polymerization.

In an alternative embodiment, the instant invention provides a composition, method of producing the same, articles made therefrom, and method of making such articles, in accordance with any of the preceding embodiments, except that the light diffusing composition exhibits a yellowness index of equal to or less than 5. All individual values and subranges from equal to or less than 5 are included herein and disclosed herein; for example, the yellowness index of the light diffusing composition may be from an upper limit of 5, 4.5, 4, 3.5, 3, 2.5, 2 or 1.

In an alternative embodiment, the instant invention provides a composition, method of producing the same, articles made therefrom, and method of making such articles, in accordance with any of the preceding embodiments, except that the blended product is prepared by dry blending to produce a dry blended product.

In an alternative embodiment, the instant invention provides a composition, method of producing the same, articles made therefrom, and method of making such articles, in accordance with any of the preceding embodiments, except that the dry blended product is further melt compounded and processed via extrusion, injection molding, blow molding, calendaring, or milling.

In an alternative embodiment, the present invention provides articles comprising the light diffusing composition in accordance with any of the preceding embodiments. Exemplary articles include light diffusers, lighting fixture components, light bulb components, panels used to cover lighting fixtures, skylights, luminaires, rear projection screens for television or film viewing, decoration, illuminated signs (especially back-lit translucent signs), greenhouse glazing, light boxes, drafting tables, automotive sunroofs, artistic applications (e.g., as visual display-case components), antiglow screens for CRT units, twin-wall glazing, LED display covers, control panels, automotive components (such as covers for automotive lights and control panels), and aircraft components (such as control panel covers). As used herein, the term "lighting diffuser" means any such article which diffuses the light emitted by an LED.

In another embodiment, the invention provides a composition consisting essentially of: a blended product of: a matrix polymer; and from 0.05 to 2.5 wt % diffuser polymer particles, wherein the diffuser polymer particles are characterized by an average diameter from 2.0 to 8μ, a particle size distribution such that at least 90 wt % of the polymer particles fall within ±30% of the volume average particle size, a refractive index, RI, from 1.50 to 1.55; a crosslinking level greater than 4%; and wherein the diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof.

In another embodiment, the invention provides a composition consisting essentially of: a blended product of: a matrix polymer; and from 0.05 to 2.5 wt % diffuser polymer particles, wherein the diffuser polymer particles are characterized by an average diameter from 2.0 to 8μ, a particle size distribution such that at least 90 wt % of the polymer particles fall within ±30% of the volume average particle size, a refractive index, RI, from 1.50 to 1.55; a crosslinking level greater than 4%; and wherein the diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof and one or more comonomers selected from the group consisting of aryl(meth)acrylate monomers and monovinyl arenes.

In another embodiment, the invention provides a composition comprising: a blended product of: a matrix polymer; and from 0.05 to 2.5 wt % diffuser polymer particles, wherein the diffuser polymer particles are characterized by an average diameter from 2.0 to 8μ, a particle size distribution such that at least 90 wt % of the polymer particles fall within ±30% of the volume average particle size, a refractive index, RI, from 1.50 to 1.55; a crosslinking level greater than 4%; and wherein the diffuser polymer particles consist essentially of an alkyl(meth)acrylate monomer copolymerized with from 5 wt % to 25 wt % crosslinking monomer selected from the group consisting of aliphatic crosslinking monomers, aromatic crosslinking monomers and combinations thereof and one or more comonomers selected from the group consisting of aryl(meth)acrylate monomers and monovinyl arenes.

In yet another embodiment, the instant invention provides a method of producing the light diffusing composition consisting essentially of copolymerizing at least one alkyl(meth) acrylate monomer copolymerized with from 5 wt % to 25 wt % crosslinking monomer selected from the group consisting of aliphatic crosslinking monomers, aromatic crosslinking monomers and combinations thereof to form diffuser polymer particles and blending the diffuser polymer particles into a matrix polymer wherein the diffuser polymer particles are present in the composition at a level from 0.05 to 2.5 wt % based on the weight of the matrix polymer plus the weight of the diffuser polymer particle.

In another embodiment, the instant invention provides articles consisting essentially of the light diffusing composition according to any of the foregoing embodiments.

EXAMPLES

The following inventive examples illustrate the present invention but are not intended to limit the scope of the invention.

Preparation of Diffuser Polymer Particle Examples

Step 1

In STEP 1, crosslinked polymer particles having a 0.25μ diameter are produced. The components of the reaction are shown in Table 1.

A reactor equipped with stirrer and condenser and blanked with nitrogen was charged with Mixture A (see Table 1) and heated to 83° C. 10 wt % of homogenized Mixture B (see Table 1) and 25% of Mixture C (see Table 1) were then added into the reactor with stirring over a period of 120 minutes while maintaining the mixture at 83° C. Stirring was continued at 83° C. for 90 minutes following addition of Mixtures B and C, after which the reactor contents were cooled to room temperature. The particle size of the resulting particles was 0.25 μm as measured by a Brookhaven Instruments particle size analyzer BI-90. "DI Water" means deionized water.

TABLE 1

| Mixture | Component | Parts by Weight |
|---|---|---|
| A | DI Water | 180 |
|   | Sodium Carbonate | 0.40 |
| B | N-Butyl Acrylate | 98.0 |
|   | Allyl Methacrylate | 1.75 |
|   | 1,4-Butanediol Diacrylate | 0.25 |
|   | 22.5% aqueous Sodium Dodecylbenzenesulfonate | 2.22 |
|   | DI Water | 40.8 |
| C | Sodium Persulfate | 0.06 |
|   | DI water | 11.9 |

Step 2

In this step, the particles created in STEP 1 are grown to 0.75μ diameter using an emulsion of n-butyl acrylate, styrene, and 1-hexanethiol. The components of the reaction are shown in Table 2.

Into a reactor equipped with stirrer and condenser and blanked with nitrogen, Mixture A was added and heated to 85° C. with stirring. Mixtures B, C, D and E (see Table 2) were added, with stirring, to the reactor over a period of 4 hours, after which the temperature was maintained at 86° C. with stirring for 60 minutes. The reactor contents were then cooled to 70° C., Mixtures F and G (see Table 2) were added, and the reactor contents were maintained at 70° C. with stirring for 1.5 hours after which the reactor contents were cooled to room temperature. The resulting emulsion polymer particles had a diameter of 0.75μ as measured by a Brookhaven Instruments particle size analyzer BI-90.

TABLE 2

| Mixture | Component | Parts by Weight |
|---|---|---|
| A | DI Water | 156 |
|   | Sodium Carbonate | 0.07 |
| B | DI Water | 1.85 |
|   | 30.10% aqueous emulsion from STEP 1 | 23.78 |
| C | n-Butyl Acrylate | 64.20 |
|   | Styrene | 14.11 |
|   | 9.76% aqueous Sodium Dodecylbenzenesulfonate | 0.87 |
|   | DI Water | 26.13 |
| D | 1-Hexanethiol | 14.70 |
|   | 9.76% aqueous Sodium Dodecylbenzensulfonate | 1.19 |
|   | DI Water | 11.94 |
| E | Potassium Persulfate | 0.08 |
|   | DI Water | 4.63 |
| F | t-Butyl Hydroperoxide 70% | 0.24 |
|   | DI Water | 3.33 |
| G | Sodium Formaldehyde sulfoxylate | 0.16 |
|   | DI Water | 6.61 |

Step 3A: Preparation of Inventive Diffuser Polymer Example 1

The polymer particles produced in the emulsion of STEP 2 are grown to 3.88μ diameter using an emulsion of butyl methacrylate, styrene, and ally methacrylate. The components of the reaction are shown in Table 3.

A reactor equipped with stirrer and condenser and blanked with nitrogen was charged with Mixture A (see Table 3), and heated to 80° C. with stirring. Homogenized mixture B (see Table 3) was added, with stirring, to the reactor, after which the temperature was maintained at 80° C. Following addition of mixture B, the reactor was stirred for 180 minutes. Mixture C (see Table 3) was then charged into the reactor, and the reactor contents maintained at 70° C., while an exothermic polymerization took place. After the reactor contents reached peak temperature, the reactor contents were maintained at 85° C. with stirring for 150 minutes. The reactor contents were then cooled to ambient temperature. The resulting emulsion particles had a diameter of 3.88μ as measured by a Malvern particle size analyzer. EGDMA means ethylene glycol dimethacrylate and TMPTMA means trimethylolpropane triacrylate. TRIGONOX 21S is tert-butyl peroxy-2-ethylhexanoate, commercially available from Akzo Nobel Corporation.

TABLE 3

| Mixture | Component | Parts by Weight |
|---|---|---|
| A | DI Water | 200 |
|   | Sodium Nitrite | 0.03 |
|   | 32.54% aqueous emulsion from STEP 2 | 2.38 |
| B | Butyl Methacrylate | 70 |
|   | Ally Methacrylate | 8.00 |
|   | Styrene | 15 |
|   | EGDMA | 0.12 |
|   | TMPTMA | 7.00 |
|   | 10% aqueous Sodium Dodecylbenzensulfonate | 7.00 |
|   | DI Water | 125 |
| C | 10% aqueous Sodium Dodecylbenzensulfonate | 1.00 |
|   | DI Water | 20 |
|   | TRIGONOX 21S | 0.60 |

Step 3B: Preparation of Inventive Diffuser Polymer Example 2

The polymer particles produced in the emulsion of STEP 2 are grown to 4.60μ diameter using an emulsion of methyl methacrylate and divinyl benzene. The components of the reaction are shown in Table 4.

A reactor equipped with stirrer and condenser and blanked with nitrogen was charged with Mixture A (see Table 4) at room temperature and the mixture was stirred overnight. Mixture B (see Table 4) to the reactor, and charged homogenized Mixture C (see Table 4) into the reactor. The reactor contents were heated to 65° C., and maintained at that temperature for 330 minutes. The temperature was then raised to 75° C., and held at that temperature for 120 minutes. The temperature was then raised to 85° C. and held at that temperature for 180 minutes. The reactor contents were then cooled to ambient temperature. The resulting emulsion particles had a diameter of 4.6μ as measured by a Malvern particle size analyzer.

TABLE 4

| Mixture | Component | Parts by Weight |
|---|---|---|
| A | DI Water | 240 |
|   | Sodium nitrite | 0.015 |
|   | PVP | 10 |
| B | 20960-XP (33.78%) (EXAMPLE 2) | 0.823 |
| C | MMA | 76.8 |
|   | DVB | 23.2 |
|   | 10% Aqueous sodium dodecylbenzenesulfonate | 8.0 |
|   | DI Water | 50 |
|   | Benzoyl peroxide | 0.6 |

Step 3C: Preparation of Inventive Diffuser Polymer Example 3

The polymer particles produced in the emulsion of STEP 2 are grown to 3.60μ diameter using an emulsion of methyl methacrylate and divinyl benzene. The components of the reaction are shown in Table 5. MMA means methyl methacrylate, PVP means polyvinyl pyrolidone and DVB means divinylbenzene.

A reactor equipped with stirrer and condenser and blanked with nitrogen was charged with Mixture A (see Table 5) at room temperature and stirred overnight. Then Mixture B (see Table 5) was added to the reactor and the temperature was raised to 80° C. Homogenized Mixture C (see Table 5) was charged into the reactor, and the mixture was stirred for 60 minutes while the temperature was maintained at 80° C. The reactor contents temperature was then cooled to 65° C. Mixture D (see Table 5) was charged into the reactor and the temperature maintained at 65° C. while an exothermic polymerization took place. After the peak temperature was reached, the reactor contents were maintained at 80° C. with stirring for 30 minutes. The reactor contents temperature were then raised to 87° C. and held at that temperature for 165 minutes before cooling the reactor contents to ambient temperature. The resulting emulsion particles had a diameter of 3.6μ as measured by a Malvern particle size analyzer.

TABLE 5

| Mixture | Component | Parts by weight |
|---|---|---|
| A | DI Water | 250 |
|   | Sodium nitrite | 0.015 |
|   | PVP | 8.0 |
| B | 20960-XP (33.78%) | 2.49 |
| C | MMA | 76.8 |
|   | DVB | 23.2 |
|   | 10% Aqueous sodium dodecylbenzenesulfonate | 8.0 |
|   | DI Water | 90 |

TABLE 5-continued

| Mixture | Component | Parts by weight |
|---|---|---|
| D | Benzoyl peroxide | 0.6 |
|   | MMA | 3.0 |

Step 3D: Preparation of Comparative Diffuser Polymer Example 1

The polymer particles produced in the emulsion of STEP 2 are grown to 5μ diameter using n-butyl acrylate and ally methacrylate in Stage I which is then followed by Stage II copolymerization of methyl methacrylate and ethyl acrylate. The components of the reactions are shown in Table 6.

A reactor equipped with stirrer and condenser and blanked with nitrogen was charged with Mixture A, heated to 90° C. with stirring. Mixture B and homogenized Mixture C were charged into the reactor, and the content in the reactor was stirred at 60° C. for 1 hour. Charge homogenized Mixture D into the reactor, kept the content in the reactor at 60° C. for 1 hour with stirring, then gradually raised the temperature to 65-70° C., while an exothermic polymerization takes place. After reach peak temperature, cooling the reactor content to 73° C. with stirring in 30 minutes, Charge half of Mixture F, Mixture E into the reactor, and the remainder of Mixture F, and Mixture G were then separately added into the reactor over a period of 2 hours. The temperature of the reactor content was maintained at 73-75° C. for 60 minutes with stirring before the content in the reactor was cooled to room temperature. The resulting emulsion particles had a diameter of 5 μm in diameter measured by a Malvern particle size analyzer.

TABLE 6

| Mixture | Component | Parts by Weight |
|---|---|---|
| Stage I | | |
| A | DI Water | 138.5 |
| B | Aqueous emulsion from EXAMPLE 2 at 29.88% solids | 0.105 |
| C | n-Butyl Acrylate | 76.80 |
|   | Allyl Methacrylate | 3.20 |
|   | 10% aqueous Sodium Dodecylbenzenesulfonate | 0.28 |
|   | DI Water | 33.12 |
| D | t-Butyl Peroctoate | 0.427 |
|   | 10% aqueous Sodium Dodecylbenzenesulfonate | 0.003 |
|   | DI Water | 2.96 |
| Stage II | | |
| E | Methyl Methacrylate | 19.20 |
|   | Ethyl Acrylate | 0.80 |
| F | Sodium Formaldehyde Sulfoxylate | 0.062 |
|   | DI Water | 6.67 |
|   | 10% aqueous Sodium Dodecylbenzenesulfonate | 0.017 |
| G | t-Butyl Hydroperoxide | 0.089 |
|   | DI Water | 10.05 |
|   | 10% aqueous Sodium Dodecylbenzenesulfonate | 0.037 |

Preparation of Composition Examples

Light diffuser beads of the compositions given in Table 7 were dry blended in polycarbonate resin (LEXAN 141, refractive index is 1.590) followed by melt compounding using a 30 mm twin screw extruder (LEISTRITZ, Somerville, N.J.) at barrel temperature ranging from 190 to 288° C. The melt compounding was followed by pelletization, drying at 60° C. in a vacuum oven, and injection molding at temperatures between 250 and 270° C. The dimension of the test plaques from the injection molding were 70 mm×70 mm×1.5 mm. "PS" means average particle size, TT means total transmittance, and YI means the yellowness index. MBX-8 are light diffusing acrylic resin particles having an average particle size of 8µ, and a refractive index 1.49, commercially available from Sekisui Chemical Co., Ltd. SI-020 is a silicone diffusing agent manufactured and commercially available from Ganz Chemical Co., Ltd and having a particle size of 2µ.

TABLE 7

| Composition Ex. | Diffuser Polymer Ex. | RI | PS (µm) | Diffuser Polymer Loading (%) | TT (%) | D50 (degree) | Haze (%) | YI |
|---|---|---|---|---|---|---|---|---|
| Inv. Ex. 1 | Inv. Ex. 1 | 1.500 | 3.88 | 1 | 83.24 | 20.3 | 102 | 3.73 |
| Inv. Ex. 2 | Inv. Ex. 2 | 1.518 | 3.60 | 1 | 87.30 | 15.7 | 101 | 3.34 |
| Inv. Ex 3 | Inv. Ex 3 | 1.518 | 4.60 | 1 | 87.20 | 18.7 | 102 | 4.27 |
| Comp. Ex. 1 | Comp. Ex. 1 | 1.468 | 5.00 | 1 | 75.93 | 33.4 | 102 | 8.50 |
| Comp. Ex. 2 | MBX-8 | 1.490 | 8.00 | 1 | 86.30 | 16.5 | 102 | 6.13 |
| Comp. Ex. 3 | SI-020 | 1.440 | 2.00 | 1 | 61.32 | 49.8 | 103 | 3.50 |

Test Methods

Test Methods Include the Following:

D50 was measured according to ASTM E167-96 (Standard practice for Goniophotometry of objects and materials). D50 is the angle at which 50% output light intensity is measured.

Haze was measured according to ASTM D1003-00 (Standard test method for haze and luminous transmittance of transparent plastics).

Yellowness Index was measured according to ASTM E 313-00 (Standard practice for calculation yellowness and whiteness indices from instrumentally measured color coordinates).

The present invention may be embodied in other forms without departing from the spirit and the essential attributes thereof, and, accordingly, reference should be made to the appended claims, rather than to the foregoing specification, as indicating the scope of the invention.

We claim:

1. A composition comprising:
   a blended product of:
      a matrix polymer; and
      from 0.05 to 2.5 wt % diffuser polymeric particles,
         wherein the diffuser polymeric particles are characterized by an average diameter from 2.0 to 8 micrometers, a particle size distribution such that at least 90 wt % of the polymer particles fall within ±30% of the volume average particle size, a refractive index, RI, from 1.50 to 1.55; a crosslinking level greater than 4%; and
      wherein the diffuser polymeric particles are produced using at least one alkyl (meth)acrylate monomer copolymerized with from 5 wt % to 25 wt % crosslinking monomer selected from the group consisting of aliphatic crosslinking monomers, aromatic crosslinking monomers and combinations thereof, and optionally, one or more comonomers selected from the group consisting of aryl (meth)acrylate monomers and monovinyl arenes; and
      wherein the diffuser polymer particles exhibit a multi-modal particle size distribution.

2. The composition according to claim 1, wherein the matrix polymer is selected from the group consisting of polycarbonates, polymethylmethacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride, copolymers, cyclic olefin copolymers, polyesters, polyethylene terephthalate and combinations thereof.

3. A composition comprising:
   a blended product of:
      a matrix polymer; and
      from 0.05 to 2.5 wt % diffuser polymeric particles,
         wherein the diffuser polymeric particles are characterized by an average diameter from 2.0 to 8 micrometers, a particle size distribution such that at least 90 wt % of the polymer particles fall within ±30% of the volume average particle size, a refractive index, RI, from 1.50 to 1.55; a crosslinking level greater than 4%; and
      wherein the diffuser polymeric particles comprise from 50 to 90 wt % units derived from at least one alkyl (meth)acrylate monomer, from 5 to 25 wt % units derived from one or more aryl (meth)acrylate comonomers, and from 5 to 25 wt % units derived from crosslinking monomer selected from the group consisting of aliphatic crosslinking monomers, aromatic crosslinking monomers and combinations thereof.

4. The composition according to claim 1 or claim 3, wherein the crosslinking monomer is divinylbenzene.

5. The composition according to claim 1 or claim 3, wherein the at least one alkyl (meth)acrylate monomer is methyl methacrylate.

6. The composition according to claim 1 or claim 3, wherein the composition exhibits a transmittance of equal to or greater than 80%.

7. The composition according to claim 1 or claim 3, wherein the composition exhibits a yellowness index of equal to or less than 5.

8. A lighting diffuser comprising the composition according to claim 1 or claim 3.

9. The composition according to claim 1 or claim 3, wherein the blended product is prepared by dry blending to produce a dry blended product.

10. The composition according to claim 9, wherein the dry blended product is further melt compounded.

11. A method of producing a light diffusing composition comprising:
   copolymerizing from 50 to 90 percent by weight of at least one alkyl (meth)acrylate monomer, from 5 to 25 percent by weight of one or more aryl (meth)acrylate comonomers, and from 5 to 25 percent by weight of one or more crosslinking monomers selected from the group consisting of aliphatic crosslinking monomers, aromatic crosslinking monomers and combinations thereof to form diffuser polymer particles; and blending the diffuser polymer particles into a matrix polymer wherein the diffuser polymer particles are present in the composition at a level from 0.05 to 2.5 wt % based on the weight of the matrix polymer plus the weight of the diffuser polymer particle;

wherein the copolymerization process to produce the light diffusing particle is selected from the group consisting of suspension polymerization, emulsion polymerization, or a combination thereof.

12. An article comprising the light diffusing composition according to claim 1 or claim 3.

13. A method for making articles comprising forming the article from the light diffusing composition according to claim 1 or claim 3, wherein the forming the article comprises one or more processes selected from the group consisting of thermoforming, extruding, calendaring, injection molding, and combinations thereof.

14. The composition according to claim 3, wherein the diffuser polymer particles exhibit a multimodal particle size distribution.

15. The composition according to claim 1 or claim 14, wherein the multimodal particle size distribution is bimodal.

16. The composition according to claim 15, wherein the bimodal particle size distribution includes a smaller particle size peak centered between 2.25 and 2.75μ and a larger particle size peak centered between 5 and 6μ.

17. The method according to claim 11, wherein the diffuser polymer particles exhibit a multimodal particle size distribution.

18. The method according to claim 17, wherein the multimodal particle size distribution is bimodal.

19. The method according to claim 18, wherein bimodal particle size distribution includes a smaller particle size peak centered between 2.25 and 2.75μ and a larger particle size peak centered between 5 and 6μ.

20. The composition according to claim 3, wherein the matrix polymer is selected from the group consisting of polycarbonates, polymethylmethacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride, copolymers, cyclic olefin copolymers, polyesters, polyethylene terephthalate and combinations thereof.

21. The composition according to claim 3, wherein the diffuser polymeric particles further comprise one or more comonomers selected from the group consisting of aryl (meth)acrylate monomers and monovinyl arenes.

* * * * *